United States Patent [19]

Fredrickson

[11] 4,242,022
[45] Dec. 30, 1980

[54] MOUNTING D-RINGS ON TRUCK TRAILERS

[76] Inventor: Ronald G. Fredrickson, 604 W. 11th, Mitchell, S. Dak. 57301

[21] Appl. No.: 32,148

[22] Filed: Apr. 23, 1979

[51] Int. Cl.³ .............................................. B60P 7/00
[52] U.S. Cl. ................... 410/107; 410/111; 410/115
[58] Field of Search ................... 410/107, 108, 26, 27, 410/28, 29, 109, 110, 111, 112, 113, 115; 105/458

[56] References Cited

U.S. PATENT DOCUMENTS

| | | | |
|---|---|---|---|
| 2,587,882 | 3/1952 | Oakley | 410/107 |
| 2,599,873 | 6/1952 | Smith | 410/110 |
| 2,811,116 | 10/1957 | Williamson | 410/107 |
| 3,180,281 | 4/1965 | Sherrie et al. | 105/458 X |
| 4,167,273 | 9/1979 | Hrasche | 410/110 X |

*Primary Examiner*—John J. Love
*Assistant Examiner*—Michael Mar
*Attorney, Agent, or Firm*—Zarley, McKee, Thomte, Voorhees & Sease

[57] ABSTRACT

A device for mounting D-rings on truck trailers having permanent side extensions is described which enables the D-rings to be positioned between adjacent side extensions. The truck trailer includes a pair of outer side frame members comprised of I-Beams which extend longitudinally along the length of the trailer. A plurality of side extension members are hingedly secured at their inner ends to the top flange of each of the I-Beams. A plurality of longitudinally spaced ring supports are secured to each of the I-Beams between adjacent side extension members. A D-ring is pivotally mounted on each of the supports and may be pivoted from a vertically disposed hanging position to an upwardly and inwardly extending position adapted to have cables, straps or the like secured thereto. The rearward end of the side extension member immediately forwardly of the D-ring is cut-away or coped as is the forward end of the side extension member immediately rearwardly of the D-ring to enable the D-ring to dwell in substantially the same vertical plane as the side extension members when the side extension members are in their folded position and the D-ring is in its hanging position. The coping of the side extension members provides a means for receiving or mounting the D-rings on the I-Beam without detracting from the strength of the side extension members and without interfering with the normal operation of the side extension members.

9 Claims, 5 Drawing Figures

MOUNTING D-RINGS ON TRUCK TRAILERS

BACKGROUND OF THE INVENTION

This invention relates to a means for mounting D-rings on truck trailers and more particularly to a means for mounting D-rings on truck trailers having side extension members permanently hingedly mounted thereon.

Truck trailers normally include at least a pair of laterally spaced and longitudinally extending I-Beams positioned at the outer sides of the trailer. Transversely extending members are ordinarily secured to and extend between the side members and a deck is normally secured to and extends between the upper surfaces of the I-Beams. D-rings or the like are commonly hingedly secured to the upper surface of the deck to enable load restraining devices such as chains, cables, straps or the like to be secured thereto. One problem associated with the positioning of the D-rings on the floor surface of the deck is that the heavy equipment positioned thereon frequently damages the D-rings or completely tears the same from the surface of the deck. Prior to this invention, it has not been possible to locate the D-rings at the sides of the truck trailer when the truck trailer had side extension members pivotally secured thereto.

Side extension members are commonly pivotally secured to the upper outer ends of the side I-Beams to enable the effective width of the deck to be increased by the width of the side extension members. The side extension members must be pivotally movable from a horizontally disposed supporting position to a folded position along the side of the truck trailer so that the truck trailer will correspond to highway width specifications.

Therefore, it is a principal object of this invention to provide a means for mounting D-rings on truck trailers having permanent side extensions mounted thereon.

A further object of the invention is to provide a means for mounting D-rings on truck trailers wherein the D-rings will not be damaged by heavy equipment on the truck trailer.

A still further object of the invention is to provide a means for mounting D-rings on truck trailers which are usable with the side extensions in the stowed or carry positions.

A still further object of the invention is to provide a means for mounting D-rings on truck trailers which is economical to manufacture, durable in use and refined in appearance.

These and other objects will be apparent to those skilled in the art.

SUMMARY OF THE INVENTION

This invention relates to the means for mounting longitudinally spaced D-rings at one side of a truck trailer having permanent side extensions mounted thereon. The side extensions are hingedly secured at their inner or upper ends to the outer end of the side frame members of the trailer. Adjacent ends of side extension members are coped or cut-away to provide a space for mounting a D-ring therebetween. A support is secured to the top flange of the trailer side frame member as well as the web portion thereof and has the D-ring pivotally mounted thereon. The D-ring occupies the space provided by the coped portions of the side extension members. The D-ring may be pivoted from the stowed or hanging position to a position where it extends upwardly and inwardly at approximately a 45° angle with respect to the frame member regardless of whether the side extension members are in the folded or carry position.

DESCRIPTION OF THE PREFERRED EMBODIMENT

The numeral 10 refers to a conventional trailer adapted to be pulled by a truck or the like. Trailer 10 includes a longitudinally extending I-Beam 12 positioned at one side of the trailer and has a longitudinally extending I-Beam at the other side of the trailer which is identical to I-Beam 12. The trailer also includes cross members or the like extending between the outer side beams to provide the necessary strength to the trailer. Normally, a deck 14 is secured to the upper portions of the side I-Beams and extends therebetween.

Figure 5:
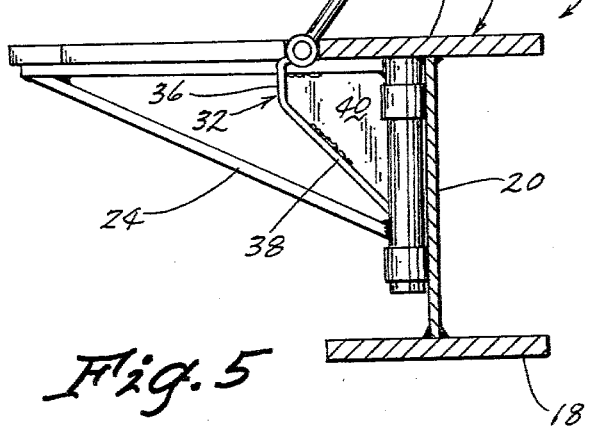
FIG. 5 is a view similar to FIG. 4 except that the side extension has been moved to the carry position and the D-ring has been pivoted up to the operative position.

For purposes of description, I-Beam 12 will be described as having a horizontally disposed upper flange 16, horizontally disposed lower flange 18, and vertically disposed web 20 extending therebetween. The numeral 22 refers to a plurality of side extension members which are hingedly secured to the I-Beam as illustrated in the drawings. The side extension members 22 may be moved from the stowed positions of FIGS. 1–4 to the carry position illustrated in FIG. 5. The side extension members 22 are maintained in the carry position of FIG. 5 by conventional supporting structure referred to generally by the reference numeral 24 in FIG. 5.

Figure 1:
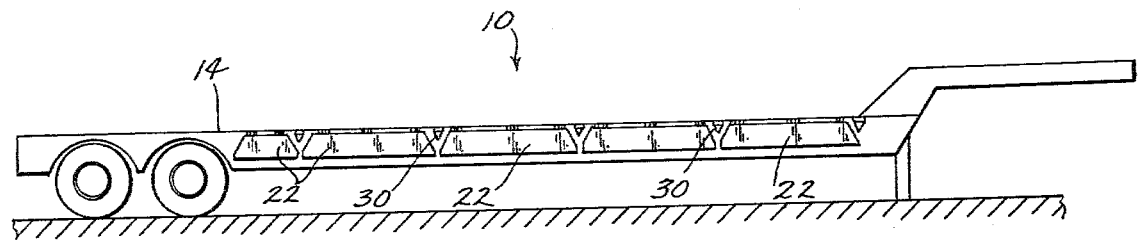
FIG. 1 is a side view of a truck trailer having the apparatus of this invention mounted thereon.
Figure 2:
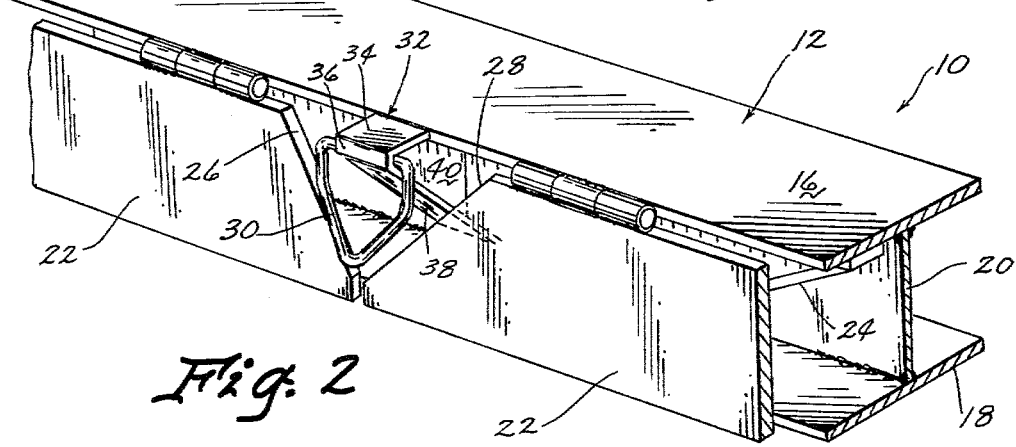
FIG. 2 is a partial perspective view of one of the D-rings and associated structure.
Figures 3, 4:
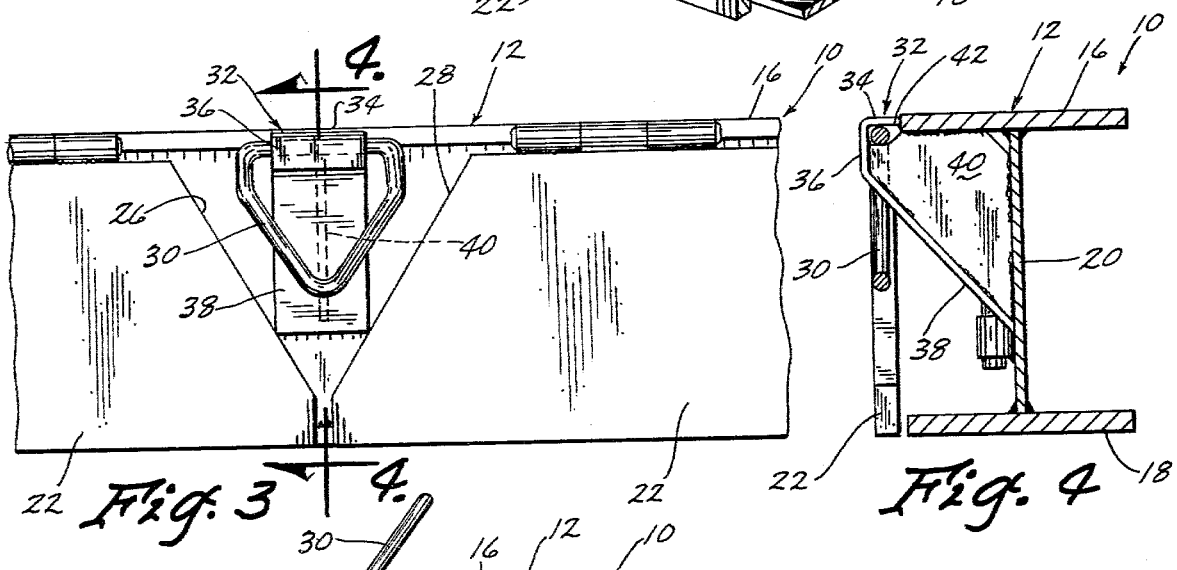
FIG. 3 is a side view of one of the D-rings and associated structure.
FIG. 4 is a sectional view seen on lines 4—4 of FIG. 3.

As seen in FIGS. 2 and 3, the rearward end of each of the side extension members 22 is cut-away or coped at 26. Likewise, the forward ends of each of the side extension members 22 are cut-away or coped at 28 to define a V-shape therebetween to permit the D-ring 30 to be secured to the truck trailer.

The numeral 32 refers generally to the support for mounting the D-ring 30 on the beam 12 and generally includes an upper or top portion 34 which is secured to and which extends outwardly from the outer edge of the flange 16. Upper portion 34 terminates in a downwardly extending portion 36 which terminates in a portion 38 which extends downwardly and inwardly for connection to the web 20 of the beam 12. Reinforcing plate 40 is positioned as illustrated in FIG. 4 and is welded to the web 20, flange 16 and support portion 38 as illustrated to strengthen the support. As seen in FIG. 4, a small opening or cut-away portion 42 is provided in the plate 40 to facilitate the positioning of the D-ring 30 on the support.

The number of D-rings 30 secured to each side of the trailer will depend upon the particular desired specifications of the individual trailer. It can be seen in the drawings that the D-ring 30 normally hangs in the stowed position so that the upper end of the D-ring does not extend above the top surface of the flange 16. It can also be seen in the drawings that the D-ring 30 dwells in substantially the same vertical plane as the side extension members 22 when the side extension members 22 are in the stowed or folded condition and the ring 30 is in its stowed position. The D-ring 30 may be pivotally moved from the stowed position of FIG. 4 to the position of FIG. 5 regardless of whether the side extension members 22 are in their stowed or carry position. The coped or cut-away portions 26 and 28 on the side extension members 22 permit the side extension members 22 to be pivotally moved without interference from the D-rings regardless of whether the D-rings are in the stowed or operative positions.

Thus it can be seen that a novel means has been provided for mounting D-rings on a truck trailer which has the permanent side extensions mounted thereon. The means for mounting the D-rings does not interfere with the normal operation of the side extension members nor do the side extension members interfere with the operation of the D-rings 30. The fact that the D-rings 30 occupy the position illustrated in FIG. 4 when in their stowed position insures that the heavy equipment on the trailer will not damage the D-rings during the loading or unloading operations. The coping of the side extension members 22 as described provides the necessary space for the D-rings without sacrificing carrying capability.

Thus it can be seen that the invention accomplishes at least all of its stated objectives.

I claim:

1. In combination,
   a truck trailer comprising a wheeled frame means including at least a pair of laterally spaced apart and longitudinally extending outer side frame members; each of said frame members comprising an I-beam having horizontally disposed upper and lower flanges and a vertically disposed web extending therebetween, each of said upper flanges on said I-beams having an outer edge; and a deck means extending between the upper flanges on said I-beams,
   a plurality of side extension members having inner and outer edge portions, and rearward and forward ends, said side extension members being hingedly secured at their inner edge portions to the outer edges of said upper flanges on said I-beams in adjacent relation, the adjacent rearward and forward ends of adjacent side extension members including at least outer portions thereof disposed in closely spaced relation,
   said extension members being movable from a substantially vertically disposed folded position to a substantially horizontally disposed extension position,
   a plurality of longitudinally spaced load restraining supports secured to each of said I-beams between at least some of the adjacent side extension members,
   a load restraining ring means pivotally mounted on each of said supports and being pivotally movable from a substantially vertically disposed hanging position outwardly of said I-beam to an operative position whereby said ring means may be extended upwardly and inwardly from the outer edge of the upper flange of said I-beam,
   at least one of the adjacent rearward and forward ends of adjacent side extension members including a cut-away portion formed therein to accommodate pivotal movement of said load restraining ring means between said hanging and operative positions.

2. The combination of claim 1 wherein the rearward end of each of the side extension members which are positioned forwardly of one of said ring means has a cut-away portion formed therein for receiving said ring means.

3. The combination of claim 1 wherein the forward end of each of the side extension members which are positioned rearwardly of one of said ring means has a cut-away portion formed therein for receiving said ring means.

4. The combination of claim 1 wherein the rearward end of each of the side extension members which are positioned forwardly of one of said ring means has a cut-away portion formed therein for receiving said ring means and wherein the forward end of each of the side extension members which are positioned rearwardly of the said ring means has a cut-away portion formed therein for receiving said ring means.

5. The combination of claim 4 wherein said ring means and said side extension members dwell in substantially the same vertical plane when said ring means is in its vertically disposed position and said side extension members are in their folded position.

6. The combination of claim 4 wherein the upper end of said ring means is disposed below the upper surface of said deck means when in its hanging position.

7. The combination of claim 1 wherein each of said supports comprises a substantially horizontally disposed first portion secured to and extending outwardly from said upper flange of the I-beam, and a second portion extending downwardly and inwardly from the outer end of said first portion, the lower end of said second portion being secured to the web of said I-beam, said ring means being pivotally secured to said support adjacent the juncture of said first and second portions thereof.

8. The combination of claim 7 wherein a reinforcing means is secured to and extends between said second portion and said I-beam.

9. In combination,
   a truck trailer comprising a wheeled frame means including at least a pair of laterally spaced apart and longitudinally extending outer side frame members; each of said frame members comprising a beam having upper and lower ends and an intermediate portion extending therebetween, each of said upper ends of said beams having an outer edge; and a deck means extending between said beams,
   a plurality of side extension members having inner and outer edge portions, and rearward and forward ends, said side extension members being hingedly secured at their inner edge portions to the outer edges of said upper ends on said beams, in adjacent relation, the adjacent rearward and forward ends of adjacent side extension members including at least outer portions thereof disposed in closely spaced relation,
   said extension members being movable from a substantially vertically disposed folded position to a substantially horizontally disposed extension position, a plurality of longitudinally spaced load restraining supports secured to each of said beams between at least some of the adjacent side extension members, a load restraining ring means pivotally mounted on each of said supports and being pivotally movable from a substantially vertically disposed hanging position laterally outwardly of said beam to an operative position whereby said ring means may be extended upwardly and inwardly from the outer edge of the upper end of said beam, at least one of the adjacent rearward and forward ends of adjacent side extension members including a cut-away portion formed therein to accommodate pivotal movement of said load restraining ring means between said hanging and operative positions.

* * * * *